(12) United States Patent
Klinger et al.

(10) Patent No.: US 8,041,460 B2
(45) Date of Patent: Oct. 18, 2011

(54) USER INTERFACE FOR ADJUSTING PARAMETERS FOR CLIMATE CONTROL SYSTEMS IN MOTOR VEHICLES

(75) Inventors: Franz Klinger, Bedburg (DE); Martin Nowak, Rosrath (DE)

(73) Assignee: Visteon Global Technologies, Inc., Van Buren Township, MI (US)

( * ) Notice: Subject to any disclaimer, the term of this patent is extended or adjusted under 35 U.S.C. 154(b) by 326 days.

(21) Appl. No.: 12/393,062

(22) Filed: Feb. 26, 2009

(65) Prior Publication Data

US 2009/0216383 A1    Aug. 27, 2009

(30) Foreign Application Priority Data

Feb. 26, 2008   (DE) .................. 10 2008 000 405

(51) Int. Cl.
*G05B 15/02* (2006.01)
(52) U.S. Cl. .................................................. 700/277
(58) Field of Classification Search .................. None
See application file for complete search history.

(56) References Cited

U.S. PATENT DOCUMENTS

| | | | | |
|---|---|---|---|---|
| 4,326,667 | A * | 4/1982 | Murata et al. | 237/12.3 A |
| 7,084,859 | B1 * | 8/2006 | Pryor | 345/173 |
| 2006/0200285 | A1 * | 9/2006 | Obradovich | 701/30 |
| 2008/0316175 | A1 * | 12/2008 | Iisaka et al. | 345/167 |

FOREIGN PATENT DOCUMENTS

| | | |
|---|---|---|
| DE | 197 28 174 C1 | 8/1998 |
| DE | 103 31 775 A1 | 2/2005 |
| DE | 10 2004 014 748 A1 | 10/2005 |
| DE | 10 2004 029 203 A1 | 12/2005 |
| DE | 10 2004 038 061 A1 | 3/2006 |
| DE | 602 05 437 T2 | 5/2006 |
| DE | 20 2006 003 543 U1 | 7/2006 |
| DE | 10 2005 007 642 A1 | 8/2006 |
| WO | WO 01/97656 A2 | 12/2001 |

* cited by examiner

*Primary Examiner* — Jeffrey A Gaffin
*Assistant Examiner* — Luis Sitiriche
(74) *Attorney, Agent, or Firm* — Fraser Clemens Martin & Miller LLC; J. Douglas Miller

(57) ABSTRACT

A user interface for adjusting a plurality of parameters of a climate control system of a motor vehicle is disclosed. The user interface includes an input element having a system of coordinates having multiple dimensions, wherein each of the dimensions of the system of coordinates is associated with at least one of the parameters of the climate control system; and a program means to perform at least one of an absolute evaluation of the parameters and an incremental evaluation of changes to the parameters between an adjusted point range and an original point range of the parameters, and transmit a data representing the evaluation to at least one of a control device and a regulation device of the climate control system in order to adjust a value of the parameters.

20 Claims, 2 Drawing Sheets

USER INTERFACE FOR ADJUSTING PARAMETERS FOR CLIMATE CONTROL SYSTEMS IN MOTOR VEHICLES

CROSS-REFERENCE TO RELATED APPLICATION

This application claims the benefit of German Patent Application No. DE 10 2008 000 405.7 filed on Feb. 26, 2008, hereby incorporated herein by reference in its entirety.

FIELD OF THE INVENTION

The invention relates to a climate control system. More particularly, the invention is directed to a user interface for adjusting parameters in the climate control system for motor vehicles.

BACKGROUND OF THE INVENTION

A discrete user interface including various knobs in the instrument panel of motor vehicles typically has separate operating elements or separate operating knobs, with each operating element being allocated to temperature adjustment, air flow adjustment, and the associated fan level setting. As such, each operating element which must be adjusted separately to select a parameter.

One problem of the discrete user interface is that to adjust the stated parameters for the functioning of the climate control system, the operating elements, which in most cases are equipped with symbols, are actuated separately and in succession by the vehicle passengers.

One method of inputting parameters of a parameter field is described in the publication DE 103 31 775 A1, in which the method for controlling a system is provided, wherein the parameter field is first represented graphically in a first parameter setting on a sensitive display screen or touch screen, using dots, lines and/or areas, and wherein the dots, lines and/or areas are adjusted by touching the display screen, so that the resulting parameter field that is displayed has a second parameter setting that is different from the first setting. The system can be a climate control system for a motor vehicle, in which the parameter field is a local temperature distribution.

One problem is that the sensitive display screen always works with only one parameter adjustment at a time, for example either with a temperature adjustment or with a volume adjustment, wherein the sensitive display screen is switched on beforehand based upon the desired parameter, using a push button. The corresponding parameter can then be keyed in using the display screen. In place of a temperature controller or a volume controller, control is accomplished by shifting a preset touch area of the display screen.

A conventional touch screen is a computer input device, in which the command-supported control sequence of a technical device, in most cases a computer, are apparently directly controlled by touching parts of a symbol. The technical conversion of a command input gives the impression of direct control of a computer via finger contact. Thus a cursor focus can be positioned on the sensitive surface using the finger or a stylus. By briefly tilting or dragging the finger or the stylus across the touch screen, a drag and drop operation can be executed.

Several technical systems exist for converting the touch sensitivity, including, for example: capacitive surfaces; resistive systems; acoustic wave controlled systems; and optical, infrared controlled systems.

As a further example, analog resistive touch screens are comprised of two conductive indium tin oxide layers (x-layer and y-layer) positioned opposite one another, which are activated using a constant direct current voltage. Between the layers are a large number of small spacer dots, which enable a separation of the two layers. When the touch screen is touched at a certain point, the two layers come into contact with one another at that point, creating an electrical contact. The resistance of this contact creates a different voltage at each point. The change in voltage can then be used to determine the coordinates x and y.

Another operating device for use in a motor vehicle to adjust continuously or quasi-continuously adjustable parameters is described in the publication DE 10 2004 029 203 A1, wherein the operating device comprises a touch screen, and an operating field can be displayed on the touch screen, wherein the parameter can be adjusted by dragging it across the operating field. In this case, the length of a dragging motion across the operating field is a measurement of the change in the parameter. Parameters can be the scale of a map for a navigational system or a target temperature for a climate control system or the volume of a radio system.

One problem is that with the touch screen, only one value can be adjusted; for example, a target temperature adjustment in the climate control system of a motor vehicle, or a volume adjustment to the radio in the instrument panel, etc., can be made.

Another operating field for adjusting comfort parameters in a motor vehicle, which is located in its instrument panel or armrest area, is described in the publication DE 10 2004 038 061 A1, wherein the adjustment is made via the operating and control elements assigned to the individual functional elements, such as seat, steering wheel and foot pedal adjustment, seat heaters and climate control. In this case, it is provided that at least two comfort parameters relevant to the well-being of a vehicle passenger can be activated on a single operating unit using symbols on sections of a human body, represented as a pictogram. For the climate control system, there are symbols for air flow and fan power, and a symbol for displaying the temperature setting, and also a symbol for seat heating and seat ventilation. The directional arrows on the symbols make it possible for the vehicle passenger to make the intended adjustment.

One problem is that vehicle passengers must actuate several separate symbols in order to adjust the climate control system.

A device for displaying information regarding the climate in the interior of a motor vehicle is described in the publication DE 20 2006 003 543 U1, wherein a display screen and a control means are provided, with which the display screen can be activated to display a silhouette of a person sitting in a seat in the interior of the vehicle. Using the control means, the display screen for displaying the silhouette of the person can be controlled by filling it with multiple colors, wherein each color is assigned a temperature. The display screen can be embodied as a so-called touch screen, in which case the operating elements are a part of the touch screen.

One problem is that to establish the climate functions of a climate control system, a plurality of partial display screens are connected to the important colored areas of passenger silhouettes, which display only the actual or the target temperature in the area assigned to that part of the body. The device contains a plurality of separately actuable operating elements for adjusting the parameters of a climate control system.

An adjustment system for motor vehicles is described in the publication EP 1 292 205 B1, wherein an operating console with a touch-sensitive display screen is provided, which is connected to a control unit supported by a microcomputer, which unit has control outputs at least to a fan unit, to air flow valves, and to temperature control elements of the climate control system, in which current settings and available options for adjusting at least the air volume, the air flow and the air temperature can be displayed in analogous symbolic representations on the display screen, which respond to touch contact to change current settings, and in which each of the analogous symbolic representations comprises a geometric shape, which delimits a closed surface, which represents an infinitely variable number of available adjustment values, and a current adjustment value is visualized within the closed area by an optically accentuated marking. In this case, the adjusted air flow is changed by shifting a point within the area of a triangle. Other analogous symbolic representations make up a symbolic slide bar.

One problem is that a plurality of symbols are shown on the touch-sensitive display screen, which can be actuated via touch contact within the scope of their indicated touch-shifting options (slide bar), and via shifting within predetermined bridges, those of the parameters—temperature, air flow, fan power—thereby adjusting the parameters. This represents a two-dimensional parameter adjustment with limited actuability, and on the touch screen, the three parameters are adjustable separately from one another.

It would be desirable to develop a user interface for adjusting parameters of a climate control system in motor vehicles, which is suitably configured such that by touch actuating one area, all three parameters can be adjusted at the same time.

SUMMARY OF THE INVENTION

Concordant and consistent with the present invention, a user interface for adjusting parameters of a climate control system in motor vehicles, which is suitably configured such that by touch actuating one area, all three parameters can be adjusted at the same time, has surprisingly been discovered.

In one embodiment, a user interface for adjusting a plurality of parameters of a climate control system of a motor vehicle, the user interface comprises: an input element having a system of coordinates having multiple dimensions, wherein each of the dimensions of the system of coordinates is associated with at least one of the parameters of the climate control system; and a program means to perform at least one of an absolute evaluation of the parameters and an incremental evaluation of changes to the parameters between an adjusted point range and an original point range of the parameters, and transmit a data representing the evaluation to at least one of a control device and a regulation device of the climate control system in order to adjust a value of the parameters.

In another embodiment, a user interface for adjusting a plurality of parameters in a climate control system of a motor vehicle, the user interface comprises: an input element including at least one of a pressure-sensitive and a contact-sensitive surface having a system of coordinates with multiple dimensions, wherein a horizontal coordinate of the input element represents a first one of the dimensions, a vertical coordinate of the input element represents a second one of the dimensions, and a third coordinate of the input element represents a third one of the dimensions orthogonal to the first one of the dimensions and the second one of the dimensions; and a program means to perform at least one of an absolute evaluation of the parameters and an incremental evaluation of changes to the parameters between a newly adjusted point range and an original point range of the parameters, and transmit a data representing the evaluation to at least one of a control device and a regulation device of the climate control system in order to adjust a value of the parameters.

In another embodiment, a user interface for adjusting a plurality of parameters in a climate control system of a motor vehicle, the user interface comprises: an input element including a roller ball located within a contact base, wherein a plurality of contacts with the roller ball, located in the contact base, is assigned a system of coordinates having multiple dimensions; and a program means to perform at least one of an absolute evaluation of the parameters and an incremental evaluation of changes to the parameters between a newly adjusted point range and an original point range of the parameters, and transmit a data representing the evaluation to at least one of a control device and a regulation device of the climate control system in order to adjust a value of the parameters.

BRIEF DESCRIPTION OF THE DRAWINGS

The above, as well as other advantages of the present invention, will become readily apparent to those skilled in the art from the following detailed description of the preferred embodiment when considered in the light of the accompanying drawings in which.

DETAILED DESCRIPTION OF EXEMPLARY EMBODIMENTS OF THE INVENTION

The following detailed description and appended drawings describe and illustrate various embodiments of the invention. The description and drawings serve to enable one skilled in the art to make and use the invention, and are not intended to limit the scope of the invention in any manner.

Figure 1:
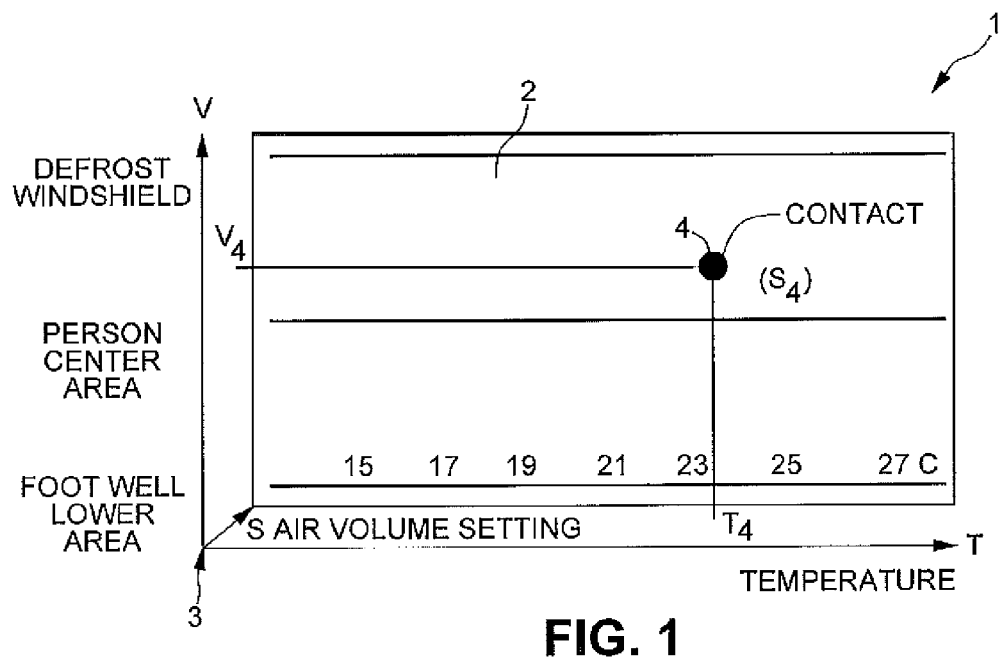
FIG. 1 a schematic representation of a first user interface in accordance with the invention, with a first input element in the form of a first display/touch-sensitive surface.

FIG. 1 illustrates a schematic representation of a first user interface 1 for adjusting a plurality of parameters of a climate control system in a vehicle according to an embodiment of the present invention. As shown, temperature (T), air flow (V), and air volume setting (S) are provided as the parameters.

In one embodiment, an input element 2 of the first user interface 1 is embodied as a 3-D coordinate element in the form of at least one of a first pressure-sensitive display/touch-sensitive surface, a touch-sensitive display area, and a touch screen. Additionally, an orthogonal system of coordinates 3 is assigned to the input element 2, wherein a horizontal coordinate represents a first dimension, a vertical coordinate represents a second dimension, and a third coordinate represents a third dimension orthogonal to the first dimension and the second dimension. As a non-limiting example, the third coordinate is pre-determined by a touch pressure intensity or a touch pressure duration exerted on the input element 2. As a further example, the parameters: temperature (T); air flow (V); and the associated air volume setting (S), are assigned to the first dimension, the second dimension and the third dimension of the orthogonal system of coordinates 3, respectively.

A program means is provided to evaluate the touched input point or the touched input point range 4, and transmit the evaluated input point range 4 via an existing communications system to a control and/or a regulation devices (not shown) of the climate control system in order to adjust the parameter values $T_4$, $V_4$, $S_4$ associated with the touched input point range 4.

The input element 2 can also represent an encoded touch-sensitive surface, wherein each established input point or each input range 4 established around the associated input point corresponds to the adjustment values for: temperature $T_4$ in integrated temperature controllers; air flow $V_4$ through air flow valves; and an associated air volume level $S_4$ for a fan setting in at least one fan unit. As a non-limiting example, each input point or input range 4 can be a marked by a predetermined designation such as a colored circular area, for example.

In the system of coordinates 3, the air flow V is configured as a height coordinate from a foot well (as the lower passenger area in the vehicle), over the level of a vehicle passenger seat (as the center passenger area in the vehicle), up to an upper windshield (i.e. defrost) (as the upper passenger area in the vehicle), wherein the adjustment of the associated air flow valves is implemented via signal technology. The adjustment of the temperature T can be accomplished by controlling the heat energy and/or the direction of flow of associated cold air streams in mixing chambers. The coordinate S corresponds to a discrete or continuous air volume setting of the fan unit.

As shown, the input range 4 is keyed in via an average contact intensity or contact duration, with a temperature $T_4 \approx 23°$, an air flow $V_4$ at the level of the person—a vehicle passenger—and somewhat in the area of the windshield, and, third, with the fan level $S_4$. The keying in is accomplished via a brief contacting and rapid release of the touch-sensitive surface 2.

Figure 2:
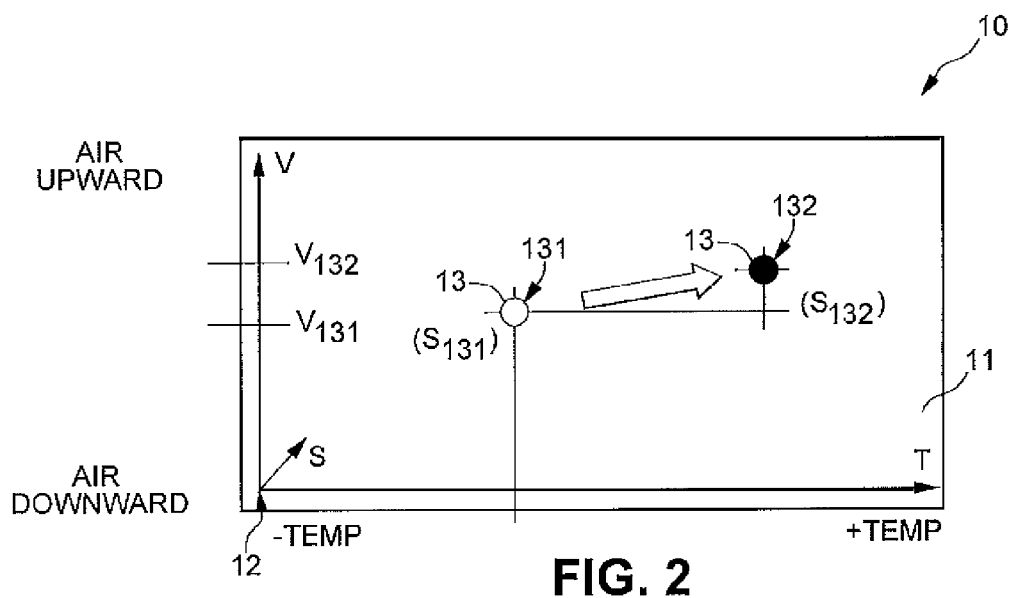
FIG. 2 a schematic representation of a second user interface in accordance with the invention, with a second input element in the form of a second display/touch-sensitive surface.

FIG. 2 shows a schematic representation of a second user interface 10 for adjusting parameters of a climate control system in vehicles, wherein temperature T, air flow V and associated air volume setting S are provided as the parameters according to another embodiment of the present invention.

As shown, an input element 11 is embodied as a 3-D coordinate element in the form of a second display/touch-sensitive surface, to which a predetermined system of coordinates 12 is assigned, wherein a horizontal coordinate represents a first dimension, a vertical coordinate represents a second dimension, and a third coordinate is embodied orthogonally to the first dimension and the second dimension. The third coordinate is predetermined by the touch shifting of a preferably marked point or touch area 13 between a shift starting point 131 and a shift end point 132 as a touch contact difference $dS=S_{132}-S_{131}$, and the three dimensions are assigned to the parameters—temperature T, air flow V, and air volume setting S, respectively.

Additionally, a program means is provided in a control unit located downstream (not shown), which evaluates the touched input point or touched input point range 13 and its position changes 131, 132, and transmits an input data via an existing communication system to the control and/or regulation devices of the climate control system in order to adjust the parameter values $T_{132}$, $V_{132}$, $S_{132}$.

The input element 11 can also be an encoded touch-sensitive surface, wherein each established point or each area 13 established around the point corresponds to the adjustment values of the temperature $T_{132}$, the air flow $V_{132}$ and the air volume setting $S_{132}$.

The displaceable area 13 with $dS=S_{132}-S_{131}$ can especially be accentuated on the touch-sensitive surface 11 at a new point or point range $T_{132}$, $V_{132}$, $S_{132}$. In FIG. 2, the temperature difference $dT=T_{132}-T_{131}$ means that the vehicle passenger would like to have a higher temperature T132, wherein a medium fan level $S_{new}=S_{132}$ is also being set.

Figure 3:
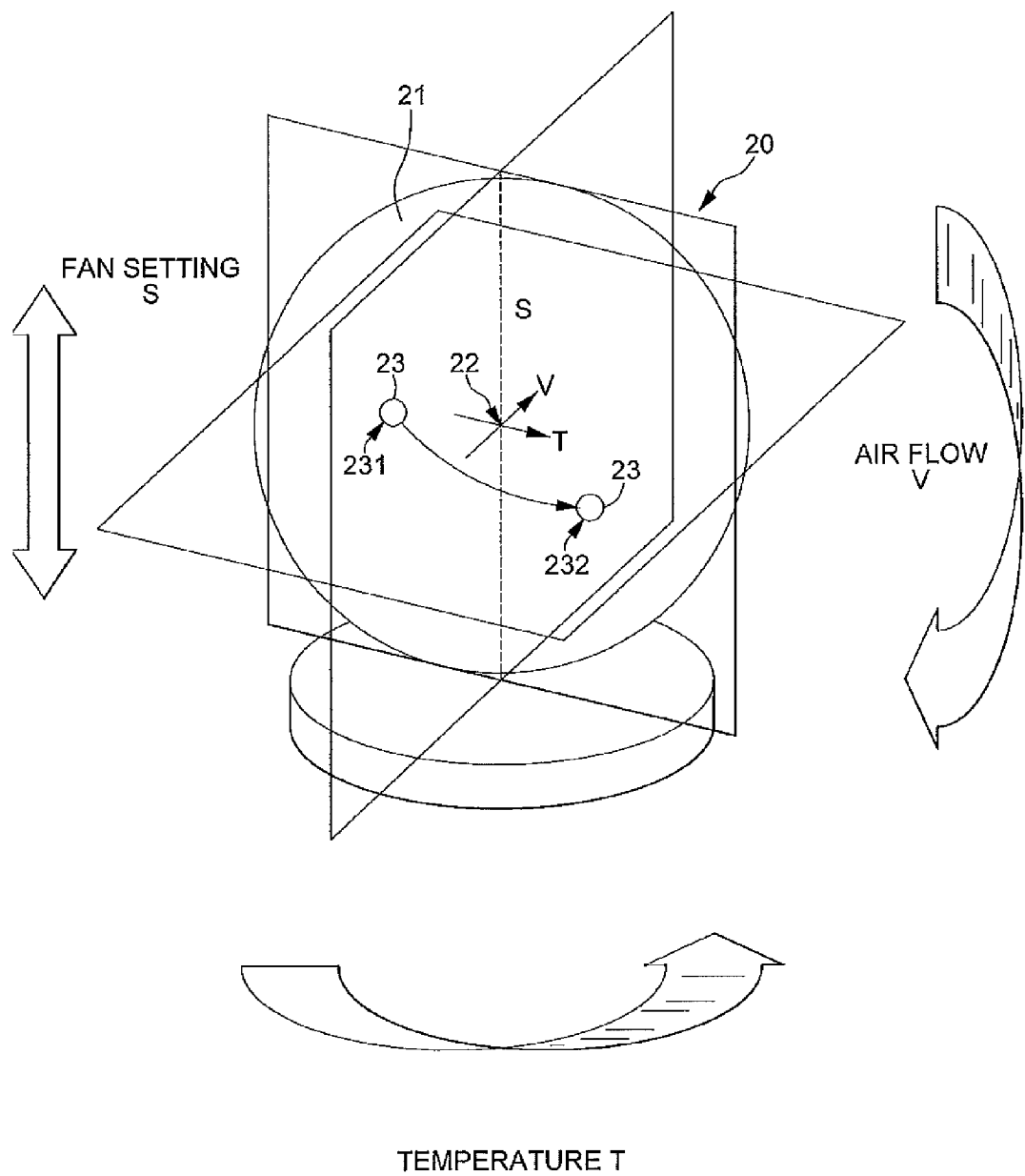
FIG. 3 a schematic representation of a third user interface, in accordance with the invention, for a third input element in the form of a roller ball.

FIG. 3 shows a schematic representation of a third user interface 20 in accordance with the invention, for adjusting parameters of a climate control system in vehicles, wherein again temperature T, air flow V and associated air volume setting S are provided as the parameters.

As shown, an input element 21 is embodied as a 3-D coordinate element in the form of a roller ball located in a contact base, wherein the contacts housed in the contact base with the roller ball 21 are assigned an orthogonal system of coordinates 22, wherein a horizontal coordinate represents a first dimension, a vertical coordinate represents a second dimension and a third coordinate is predetermined to the dimension that is orthogonal to the first dimension and the second dimension. As a non-limiting example, the three dimensions are assigned to the parameters: temperature T, air flow V and the associated air volume setting S, respectively.

Additionally, a program means is provided to convert the input contact-based point 23 ($T_{232}$, $V_{232}$, $S_{232}$) or input contact-based point range 23 into the parameters, and evaluate these, and transmit them via an existing communication system to the control and/or regulation devices of the climate control system in order to adjust the parameter values. In this case, the respective end position of the roller ball 21 then corresponds to the predetermined target parameters $T_{232}$, $V_{232}$, $S_{232}$.

In a third embodiment, the input element 21 can thus be a roller ball that can be rotated in the corresponding contact base, or a computer-operable mouse that is equipped with a roller ball, in which, to each roller ball position 231, 232, a predetermined 3-D point or 3-D area 23 established around the points can be assigned the three adjustment values for the temperatures $T_{231}$, $T_{232}$, the air flows $V_{231}$, $V_{232}$ and the associated air volume settings $S_{231}$, $S_{232}$.

The roller ball 21 and its contact base can be arranged together, in the form of an input device (space ball, space mouse).

In another embodiment, the associated contact base can have a window, via which the roller ball 21 can be actuated or adjusted by the user, and on the roller ball 21, the three parameters $T_{target}$, $V_{target}$, $S_{target}$ assigned to the adjustable area of the roller ball 21 can be identified from this window.

Adjustment value implementation controls situated downstream from the user interface 1, 10, 20 can be assigned the respective parameters, the controls being connected to the planned control and/or regulation devices of the climate control system so as to control and/or regulate the respective outputs for achieving the three parameters $T_{target}$, $V_{target}$, $S_{target}$ adjusted by the user.

The functioning process is described in greater detail in what follows:

By touch contacting a different point or point range 4, 13, 23, an original status of the parameters $T_u$, $V_u$, $S_u$ (with the index u meaning original) can be changed to a new parameter status $T_n$, $V_n$, $S_n$ (with the index n meaning new)=$T_{target}$, $V_{target}$, $S_{target}$ via a subsequent touch contacting of the input element 2, 11, 21. The touch contacting can be accomplished in the customary manner using a finger or an accessory means, preferably a stylus.

In this case, the touch contacting during input, depending upon the embodiment of the input element 2, 11, 21, can be embodied as typing via pressure pulses, or as a sliding displacement as in the case of touch-sensitive surfaces, or as a rotational displacement as in the case of the roller ball-supported user interfaces or input devices.

Accordingly, the user interface 1, 10, 20 maximizes configuration options for an appropriate appearance, provides for a positioning of the input element in any location, for example at the center of the steering wheel, wherein in this case, comfort and safety are increased, provides for an embodiment of the input element as a mobile or wireless device, minimizes the number of movable parts that may require repairs in the case of the roller ball, maximizes operating comfort, minimizes resource consumption due to the elimination of a separate operating device, and eliminates the requirement of a separate operating for each control parameter in the climate system.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A user interface for adjusting a plurality of parameters of a climate control system of a motor vehicle, the user interface comprising:
   an input element having a system of coordinates having multiple dimensions, wherein each of the dimensions of the system of coordinates is associated with at least one of the parameters of the climate control system, and wherein a selection of a single adjusted point range in the system of coordinates simultaneously selects values for the plurality of parameters of the climate control system; and
   program means to perform at least one of an absolute evaluation of the parameters and an incremental evaluation of changes to the parameters between the adjusted point range and an original point range of the parameters, and transmit a data representing the evaluation to at least one of a control device and a regulation device of the climate control system in order to adjust the values of the parameters.

2. The user interface according to claim 1, wherein the input element is at least one of a pressure-sensitive surface and a contact-sensitive surface.

3. The user interface according to claim 2, wherein at least one coordinate of the system of coordinates is pre-determined by at least one of a touch pressure intensity, a touch pressure duration exerted on the input element, a touch contact area, and a touch contacting distance measured between a shift starting point and a shift end point.

4. The user interface according to claim 1, wherein a horizontal coordinate of the input element represents a first one of the dimensions, a vertical coordinate of the input element represents a second one of the dimensions, and a third coordinate of the input element represents a third one of the dimensions orthogonal to the first one of the dimensions and the second one of the dimensions.

5. The user interface according to claim 1, wherein the input element is an encoded contact-sensitive surface, and wherein the adjusted point range corresponds to an adjustment value for at least one of the parameters.

6. The user interface according to claim 1, wherein the input element is an encoded contact-sensitive surface, and wherein the adjusted point range corresponds to at least one of an adjustment value for temperature in an integrated temperature controller, an adjustment value for air flow through air flow valves, and an adjustment value for an associated air volume setting by means of a fan setting in at least one fan unit of the climate control system.

7. The user interface according to claim 1, wherein at least one of the original point range and the adjusted point range is associated with a display marker.

8. The user interface according to claim 1, wherein a first dimension of the input element is assigned to a parameter for temperature, a second dimension of the input element is assigned to a parameter for air flow, and a third dimension of the input element is assigned to a parameter for air volume setting.

9. The user interface according to claim 8, wherein the second one of the dimensions of the input element assigned to the parameter for air flow is configured as a dimension from a foot well, over the vehicle passenger seat level, and to the upper windshield, and wherein a plurality of associated flow valves in the climate control system are adjusted in response to a value of the parameter for air flow, and wherein the adjustment of a temperature is accomplished by controlling at least one of a heat energy and a direction of flow of adjustable air streams in mixing chambers, and wherein the parameter for air volume setting corresponds with a setting of a fan unit of the climate control system.

10. A user interface for adjusting a plurality of parameters in a climate control system of a motor vehicle, the user interface comprising:
    an input element including at least one of a pressure-sensitive and a contact-sensitive surface having a system of coordinates with multiple dimensions, wherein a horizontal coordinate of the input element represents a first one of the dimensions, a vertical coordinate of the input element represents a second one of the dimensions, and a third coordinate of the input element represents a third one of the dimensions orthogonal to the first one of the dimensions and the second one of the dimensions, and wherein a selection of a single adjusted point range in the system of coordinates simultaneously selects values for the plurality of parameters of the climate control system; and
    program means to perform at least one of an absolute evaluation of the parameters and an incremental evaluation of changes to the parameters between the adjusted point range and an original point range of the parameters, and transmit a data representing the evaluation to at least one of a control device and a regulation device of the climate control system in order to adjust a value of the parameters.

11. The user interface according to claim 10, wherein the third coordinate is pre-determined by at least one of a touch pressure intensity, a touch pressure duration exerted on the input element, a touch contact area, and a touch contacting distance measured between a shift starting point and a shift end point.

12. The user interface according to claim 10, wherein the input element includes an encoded contact-sensitive surface, and wherein the adjusted point range corresponds to at least one of an adjustment value for temperature in an integrated temperature controller, an adjustment value for air flow through air flow valves, and an adjustment value for an associated air volume setting by means of a fan setting in at least one fan unit of the climate control system.

13. The user interface according to claim 10, wherein at least one of the original point range and the adjusted point range is associated with a display marker.

14. The user interface according to claim 10, wherein the first one of the dimensions of the input element is assigned to a parameter for temperature, the second one of the dimensions of the input element is assigned to a parameter for air flow, and the third one of the dimensions of the input element is assigned to a parameter for air volume setting.

15. The user interface according to claim 14, wherein the second one of the dimensions of the input element assigned to the parameter for air flow is configured as a dimension from a foot well, over the vehicle passenger seat level, and to the upper windshield, and wherein a plurality of associated flow valves in the climate control system are adjusted in response to a value of the parameter for air flow, and wherein the adjustment of a temperature is accomplished by controlling at least one of a heat energy and a direction of flow of adjustable air streams in mixing chambers, and wherein the parameter for air volume setting corresponds with a setting of a fan unit of the climate control system.

16. A user interface for adjusting a plurality of parameters in a climate control system of a motor vehicle, the user interface comprising:

an input element including a roller ball located within a contact base, wherein a plurality of contacts with the roller ball, located in the contact base, is assigned a system of coordinates having multiple dimensions, and wherein a selection of a single adjusted point range in the system of coordinates simultaneously selects values for the plurality of parameters of the climate control system; and program means to perform at least one of an absolute evaluation of the parameters and an incremental evaluation of changes to the parameters between the adjusted point range and an original point range of the parameters, and transmit a data representing the evaluation to at least one of a control device and a regulation device of the climate control system in order to adjust a value of the parameters.

17. The user interface according to claim 16, wherein each of the original point range and the adjusted point range is associated to a position of the roller ball, and wherein each of the original point range and the adjusted point range corresponds to an adjustment value for at least one of the parameters.

18. The user interface according to claim 16, wherein each of the original point range and the adjusted point range is associated to a position of the roller ball, and wherein each of the original point range and the adjusted point range corresponds to at least one of an adjustment value for temperature in an integrated temperature controller, an adjustment value for air flow through air flow valves, and an adjustment value for an associated air volume setting by means of a fan setting in at least one fan unit of the climate control system.

19. The user interface according to claim 16, wherein the associated contact base has a window, through which the roller ball can be actuated by a user, and wherein a parameter assigned to an adjusted area of the roller ball can be identified through the window.

20. The user interface according to claim 16, wherein a touch contacting of the input element can be implemented using at least one of a finger or an accessory means.

* * * * *